United States Patent
Sasaki

(10) Patent No.: US 11,859,977 B2
(45) Date of Patent: Jan. 2, 2024

(54) SURVEYING DEVICE, SURVEYING METHOD, AND SURVEYING PROGRAM

(71) Applicant: TOPCON CORPORATION, Tokyo (JP)

(72) Inventor: You Sasaki, Tokyo (JP)

(73) Assignee: TOPCON CORPORATION, Tokyo (JP)

(*) Notice: Subject to any disclaimer, the term of this patent is extended or adjusted under 35 U.S.C. 154(b) by 0 days.

(21) Appl. No.: 18/183,183

(22) Filed: Mar. 14, 2023

(65) Prior Publication Data

US 2023/0296378 A1    Sep. 21, 2023

(30) Foreign Application Priority Data

Mar. 18, 2022  (JP) ................................ 2022-043526

(51) Int. Cl.
| | | |
|---|---|---|
| *G01C 15/00* | (2006.01) | |
| *G01S 3/786* | (2006.01) | |
| *G01C 15/12* | (2006.01) | |
| *G01C 1/00* | (2006.01) | |

(52) U.S. Cl.
CPC ............. *G01C 15/006* (2013.01); *G01C 1/00* (2013.01); *G01C 15/12* (2013.01); *G01S 3/7861* (2013.01)

(58) Field of Classification Search
CPC ...... G01C 15/006; G01C 15/00; G01C 15/12; G01S 3/7861
See application file for complete search history.

(56) References Cited

U.S. PATENT DOCUMENTS

| | | | |
|---|---|---|---|
| 11,592,291 B2 | 2/2023 | Sasaki | |
| 2014/0022539 A1* | 1/2014 | France | G01C 3/08 701/1 |
| 2016/0010987 A1* | 1/2016 | Ishida | G01C 17/34 33/292 |
| 2020/0011664 A1 | 1/2020 | Sasaki | |

FOREIGN PATENT DOCUMENTS

JP    2020-008406 A    1/2020

OTHER PUBLICATIONS

Extended European Search Report dated Aug. 11, 2023 in connection with European Patent Application No. 23157364.3, 6 pgs.

* cited by examiner

*Primary Examiner* — Thanh Luu
(74) *Attorney, Agent, or Firm* — CHIESA SHAHINIAN & GIANTOMASI PC

(57) ABSTRACT

A technique that enables easily determining an attitude of a laser scanning apparatus is provided. A surveying device includes a sunlight incident direction measurement unit, a Sun direction acquisition unit, and an attitude calculator. The sunlight incident direction measurement unit measures an incident direction of sunlight that enters a laser scanning apparatus, based on a detected waveform of incident light entering the laser scanning apparatus. The Sun direction acquisition unit acquires a direction of the Sun as seen from the laser scanning apparatus, from astronomical data, based on a position of the laser scanning apparatus. The attitude calculator calculates an attitude of the laser scanning apparatus in an absolute coordinate system, based on the incident direction of sunlight and the direction of the Sun as seen from the laser scanning apparatus, which is acquired from the astronomical data.

6 Claims, 4 Drawing Sheets

SURVEYING DEVICE, SURVEYING METHOD, AND SURVEYING PROGRAM

CROSS REFERENCE TO RELATED APPLICATIONS

This application claims priority from Japanese patent application No. 2022-043526 filed, Mar. 18, 2022; the disclosure of which is incorporated herein by reference in its entirety.

FIELD

The present invention relates to a technique for laser scanning.

BACKGROUND

Laser scanning is employed as a means for surveying at, for example, construction sites. In this situation, it is necessary to first determine a position and an attitude of a laser scanning apparatus (for example, refer to Japanese Unexamined patent application Publication No. 2020-008406). The position can be determined with high accuracy by relative positioning using a global navigation satellite system (GNSS). The attitude can be determined by using an inertial measurement unit (IMU) or a highly accurate compass.

SUMMARY OF THE INVENTION

The method using an IMU or a highly accurate compass requires preparing an expensive dedicated device used with an additional accurate operation. In view of these circumstances, an object of the present invention is to provide a technique that enables easily determining an attitude of a laser scanning apparatus.

The present invention provides a surveying device including a processor or circuitry configured to measure an incident direction of sunlight that enters a laser scanning apparatus, based on a detected waveform of incident light entering the laser scanning apparatus. The processor or circuitry is further configured to acquire a direction of the Sun as seen from the laser scanning apparatus, from astronomical data, based on a position of the laser scanning apparatus. The processor or circuitry is further configured to calculate an attitude of the laser scanning apparatus in an absolute coordinate system, based on the incident direction of sunlight and the direction of the Sun as seen from the laser scanning apparatus, which is acquired from the astronomical data.

In one aspect of the present invention, the processor or circuitry may be further configured to measure the incident direction of sunlight under a condition in which incident light is continuously detected in an angle range corresponding to an apparent diameter of the Sun.

In another aspect of the present invention, the laser scanning apparatus may perform laser scanning at an angle interval Δθ that is shorter than the apparent diameter of the Sun, and the incident direction of sunlight may be measured based on a difference between the angle interval Δθ and the angle range corresponding to the apparent diameter of the Sun. In yet another aspect of the present invention, setting related to the apparent diameter may be changeable in accordance with weather.

The present invention also provides a surveying method including measuring an incident direction of sunlight that enters a laser scanning apparatus, based on a detected waveform of incident light entering the laser scanning apparatus. The method also includes acquiring a direction of the Sun as seen from the laser scanning apparatus, from astronomical data, based on a position of the laser scanning apparatus. The method further includes calculating an attitude of the laser scanning apparatus in an absolute coordinate system, based on the incident direction of sunlight and the direction of the Sun as seen from the laser scanning apparatus, which is acquired from the astronomical data.

The present invention further provides a non-transitory computer recording medium storing computer executable instructions for surveying that are made to, when read and executed by a computer processor, cause the computer processor to measure an incident direction of sunlight that enters a laser scanning apparatus, based on a detected waveform of incident light entering the laser scanning apparatus. The computer processor also performs acquiring a direction of the Sun as seen from the laser scanning apparatus, from astronomical data, based on a position of the laser scanning apparatus. The computer processor further performs calculating an attitude of the laser scanning apparatus in an absolute coordinate system, based on the incident direction of sunlight and the direction of the Sun as seen from the laser scanning apparatus, which is acquired from the astronomical data.

The present invention enables easily determining an attitude of a laser scanning apparatus.

DETAILED DESCRIPTION

1. First Embodiment

Overview

Figure 1:
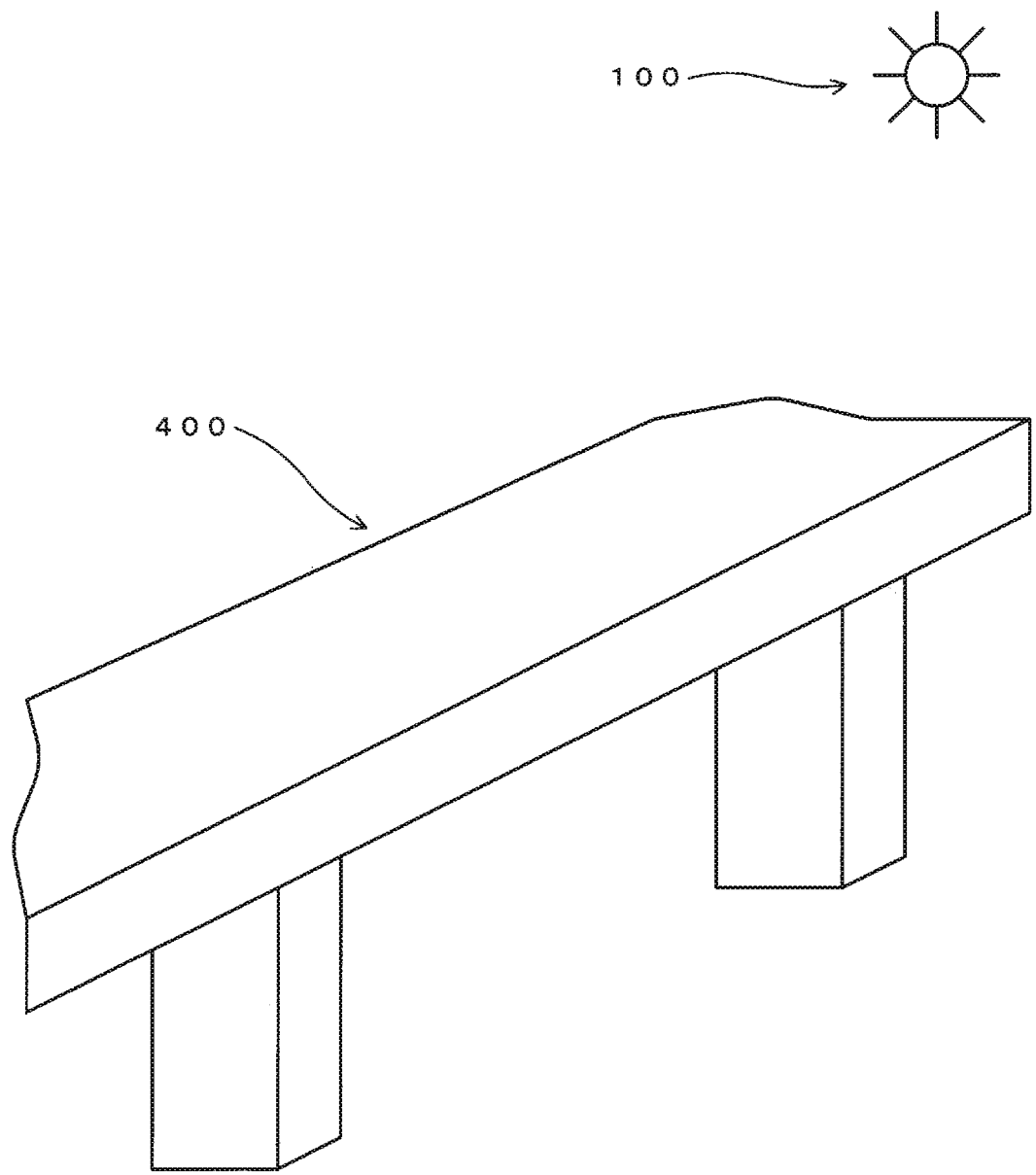
FIG. 1 shows a situation of laser scanning.

FIG. 1 shows a situation in which a laser scanning apparatus 200 is set up at a site at which point cloud data is to be obtained. FIG. 1 illustrates a bridge 400 as an example of a target from which point cloud data is to be obtained. In addition, the Sun 100 appearing in the sky is also illustrated. Herein, the attitude of the laser scanning apparatus 200 is not yet known, but the laser scanning apparatus 200 is positioned as horizontal as possible.

In this example, first, the position of the laser scanning apparatus 200 is measured by a GNSS or the like. Then, 360-degree circumferential scanning is performed by the laser scanning apparatus 200, in order to measure the direction of the Sun 100. Laser scanning light contains pulses of light, whereas sunlight does not contain pulses of light. Thus, an output waveform of a light reception unit 202 of the laser scanning apparatus 200 differs from that of laser scanning light that is reflected back. Specifically, detected waveforms thereof differ from each other.

By use of this difference between detected waveforms, the detected waveform of sunlight is distinguished, and the direction of sunlight is obtained. On the other hand, the direction of the Sun as seen from the set-up position can be derived from astronomical data under the condition that the time is known. From this point of view, a measured value of the direction of the Sun 100 as seen from the laser scanning apparatus 200 is compared with the direction of the Sun 100 derived from astronomical data, and the attitude of the laser scanning apparatus 200 is calculated.

Structure of Hardware

Figure 2:
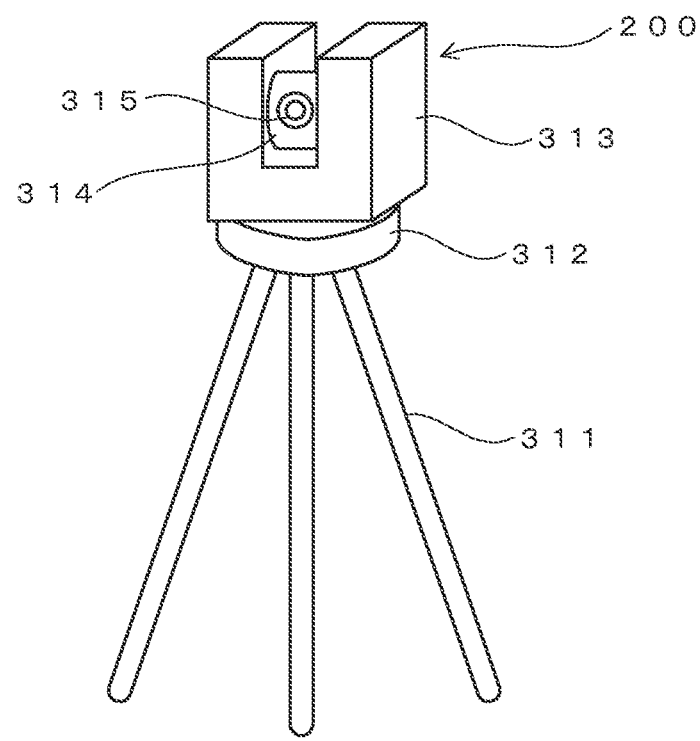
FIG. 2 shows an external appearance of a laser scanning apparatus.

FIG. 2 shows an external appearance of the laser scanning apparatus (laser scanner) 200. The laser scanning apparatus 200 includes a tripod 311, a base 312 that is fixed on top of the tripod 311, a horizontal rotation unit 313 that is a rotary body being horizontally rotatable on the base 312, and a vertical rotation unit 314 that is a rotary body being vertically rotatable relative to the horizontal rotation unit 313. In addition, a control panel (not shown) is disposed on a back side of the horizontal rotation unit 313.

The vertical rotation unit 314 includes an optical unit 315 that emits and receives laser scanning light. The optical unit 315 emits pulses of laser scanning light. The emission of pulses of laser scanning light is performed along a direction (vertical plane) orthogonal to a rotation axis (axis extending in the horizontal direction) of the vertical rotation unit 314 while the vertical rotation unit 314 rotates. That is, the optical unit 315 emits pulses of laser scanning light along a vertical angle direction (direction of an elevation angle and a depression angle).

Laser scanning is performed on the surrounding area as follows: pulses of laser scanning light are emitted from the optical unit 315 while the horizontal rotation unit 313 is rotated horizontally and the vertical rotation unit 314 is rotated vertically, and the laser scanning light that is reflected back from a target object is received by the optical unit 315.

The horizontal rotation unit 313 is rotated horizontally while scanning along the vertical angle direction (upper-lower scanning) is performed, whereby a scanning line along the vertical angle direction (upper-lower scanning line) moves in such a manner as to slide along the horizontal angle (horizontal) direction. Performing the horizontal rotation at the same time as the vertical rotation causes the scanning line along the vertical angle direction (upper-lower scanning line) to not be perfectly along the vertical direction and be slightly slanted. Under the condition in which the horizontal rotation unit 313 is not rotated, scanning along the vertical angle direction (upper-lower scanning) is performed along the vertical direction.

Rotation of each of the horizontal rotation unit 313 and the vertical rotation unit 314 is performed by a motor. Each of a horizontal rotation angle of the horizontal rotation unit 313 and a vertical rotation angle of the vertical rotation unit 314 is accurately measured by an encoder.

Each laser scanning light is one pulse of distance measuring light. One pulse of the laser scanning light is emitted to a scanning target point that reflects it, and a distance of this point is thereby measured. On the basis of this measured distance value and the direction of emission of the laser scanning light, the position of the scanned point (point that reflects the laser scanning light) is calculated relative to the laser scanning apparatus 200.

In one case, the laser scanning apparatus 200 outputs a laser-scanned point cloud by providing data of a distance and a direction related to each point (each scanned point). In another case, the laser scanning apparatus 200 internally calculates a position of each point in a certain coordinate system, and a three-dimensional coordinate position of each point is output as point cloud data. Data of the laser-scanned point cloud also contains information of luminance of each scanned point (intensity of light that is reflected back from each scanned point).

Figure 3:
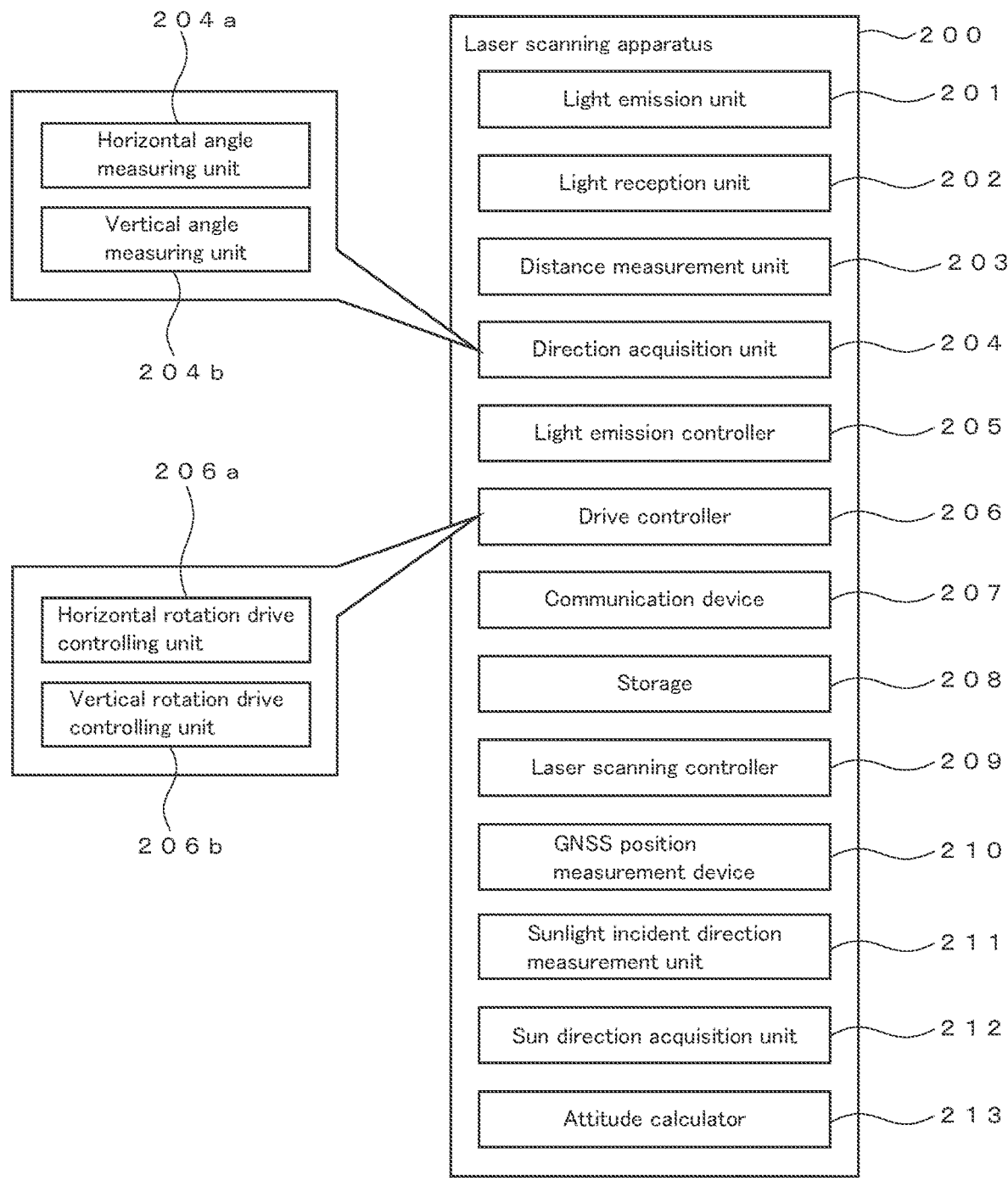
FIG. 3 shows a block diagram of the laser scanning apparatus.

FIG. 3 is a block diagram of the laser scanning apparatus 200. The laser scanning apparatus 200 includes a light emission unit 201, a light reception unit 202, a distance measurement unit 203, a direction acquisition unit 204, a light emission controller 205, a drive controller 206, a communication device 207, a storage 208, a laser scanning controller 209, a GNSS position measurement device 210, a sunlight incident direction measurement unit 211, a Sun direction acquisition unit 212, and an attitude calculator 213.

The laser scanning apparatus 200 includes a built-in computer having a central processing unit (CPU), a memory, a communication interface, a user interface, and a clock. This computer performs arithmetic calculations related to positioning. Moreover, this computer implements functions of the sunlight incident direction measurement unit 211, the Sun direction acquisition unit 212, and the attitude calculator 213.

The light emission unit 201 includes a light emitting element that emits laser scanning light and also includes an optical system and peripheral circuits related to emission of light. The light reception unit 202 includes a light receiving element that receives laser scanning light and also includes an optical system and peripheral circuits related to reception of light.

The distance measurement unit 203 calculates a distance from the laser scanning apparatus 200 to a point that reflects laser scanning light (scanned point), based on output of the light reception unit 202. In this example, a reference optical path is provided inside the laser scanning apparatus 200. The laser scanning light is output from the light emitting element and is split into two beams. One beam is emitted from the optical unit 315 to a target object, as laser scanning light, whereas the other beam is led to the reference optical path as reference light.

The laser scanning light is reflected back from the target object and is received at the optical unit 315, whereas the reference light propagates in the reference optical path. Then, these two beams are combined together and then enter the light reception unit 202. The propagation distances of the laser scanning light and the reference light differ from each other, and therefore, the reference light is detected first by the light receiving element, and the laser scanning light is then detected by the light receiving element.

In terms of an output waveform of the light receiving element, a detection waveform of the reference light is output first, and a detection waveform of the laser scanning light is then output after a time interval. The distance to the point that reflects the laser scanning light is calculated from a phase difference (time difference) between the two waveforms. In another case, the distance can also be calculated from a time-of-flight of laser scanning light.

The direction acquisition unit 204 acquires a direction of the optical axis of laser scanning light. The direction of the optical axis is obtained by measuring an angle (horizontal angle) of the optical axis in the horizontal direction and an angle (elevation angle or depression angle) of the optical axis in the vertical direction. The direction acquisition unit 204 has a horizontal angle measuring unit 204a and a vertical angle measuring unit 204b.

The horizontal angle measuring unit 204a measures a horizontal rotation angle of the horizontal rotation unit 313. The horizontal rotation is rotation around the vertical direction. This angle is measured by an encoder. The vertical angle measuring unit 204*b* measures a vertical rotation angle (elevation angle or depression angle) of the vertical rotation unit 314. The vertical rotation is rotation around the horizontal direction. This angle is measured by an encoder.

Measuring a horizontal rotation angle of the horizontal rotation unit 313 and a vertical rotation angle of the vertical rotation unit 314 provides a direction of the optical axis of laser scanning light, that is, a direction of a laser-scanned point, as seen from the laser scanning apparatus 200.

The light emission controller 205 controls timing of emission of laser scanning light of the light emission unit 201. The drive controller 206 includes a horizontal rotation drive controlling unit 206*a* for controlling driving to make the horizontal rotation unit 313 rotate horizontally and a vertical rotation drive controlling unit 206*b* for controlling driving to make the vertical rotation unit 314 rotate vertically. The driving is performed by motors.

The communication device 207 communicates with other devices. The communication is performed by wired communication or by using a wireless local area network (LAN), a mobile phone network, or the like. The storage 208 is composed of a semiconductor memory or a hard disk drive and stores an operation program and data that are necessary to operate the laser scanning apparatus 200 and data that are obtained during processing and as a result of operation.

The laser scanning controller 209 controls operation of the laser scanning apparatus 200. The GNSS position measurement device 210 performs positioning using a GNSS. In the case of requiring high accuracy, relative positioning is performed.

The sunlight incident direction measurement unit 211 measures an incident direction of sunlight that enters the laser scanning apparatus 200, based on a detected waveform of incident light entering the laser scanning apparatus 200. In this example, the sunlight incident direction measurement unit 211 obtains an incident direction as seen from the laser scanning apparatus 200 of incident light that satisfies predetermined conditions, thereby being presumed as being sunlight.

Herein, sunlight is determined based on the following conditions. Sunlight does not include pulses of light, unlike scanning light (distance measuring light). In view of this, conditions for presuming an output waveform of a light receiving element as a detected waveform of sunlight are set, and incident light satisfying these conditions is determined as being sunlight (first determination).

Figure 5:
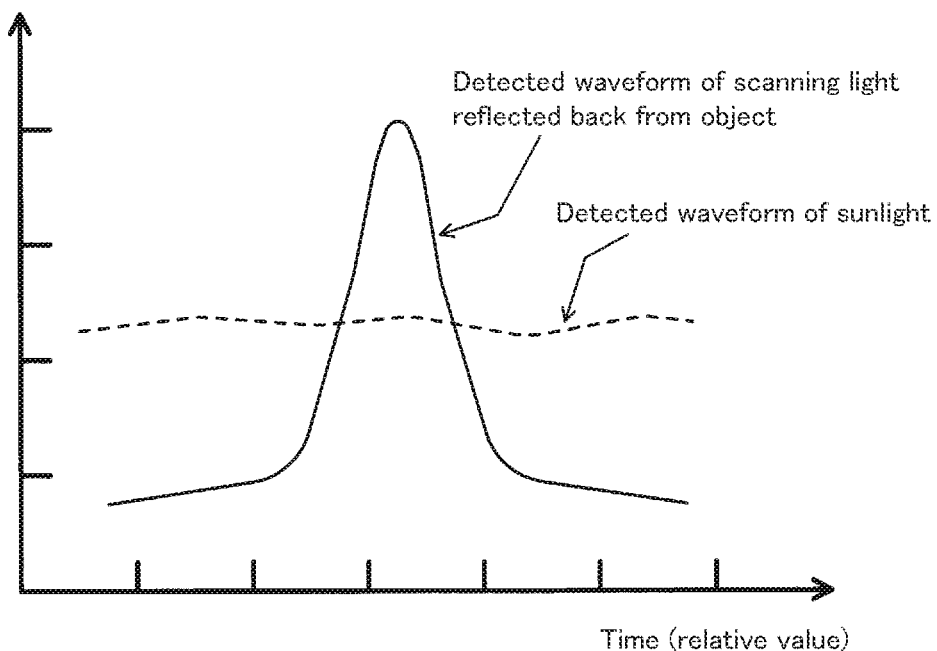
FIG. 5 is a waveform diagram showing examples of a detected waveform of light reflected back from an object and a detected waveform of sunlight.

FIG. 5 shows examples of a detected waveform of light reflected back from an object and a detected waveform of sunlight in laser scanning. Laser scanning light includes pulses of light, and therefore, laser scanning light that is reflected back generates a single-peak waveform having a pulse shape, as shown in FIG. 5. On the other hand, a detected waveform of sunlight does not have a pulse shape waveform.

The pulse waveform of laser scanning light that is reflected back shown in FIG. 5 is merely an example. A pulse width, a value of wave height, and a shape of waveform can vary depending on the type and driving method of a light emitting element, a distance to a target, output of laser scanning light, conditions and a reflectivity of a reflection surface of a target that reflects, etc.

In consideration of this, characteristics specific to a detection waveform of sunlight are recognized to determine whether sunlight is detected. Specifically, peculiarities of a detected waveform as illustrated in FIG. 5 are used to specify conditions for identifying incident sunlight, and a detected waveform satisfying the conditions is determined as being of sunlight. The incident direction of sunlight entering the laser scanning apparatus 200 is obtained in terms of a direction (horizontal angle and vertical angle) of an optical axis at the time of receiving light that is determined as being incident sunlight.

It is determined whether a waveform is a detection waveform of incident sunlight, based on a combination of two or more of the following criteria: for example, whether a peak is detected during a predetermined time, whether fluctuation of amplitude of a waveform is detected during a predetermined time, whether a rise and a fall of a waveform are detected during a predetermined time, length of duration of a peak, width of fluctuation of a value of wave height during a predetermined time, and a slope of one or both of a rise and a fall of a waveform.

The following describes a specific example. In one example, a pulse width of laser scanning light is assumed to be 0.5 µs. This pulse width depends on a light emitting element and a drive circuit thereof. In this case, when incident light exceeding a predetermined threshold is detected, the incident light is determined as being sunlight unless a single-peak waveform having a value of wave height exceeding a predetermined value is detected during a time of 2 µs.

Moreover, in this example, a second determination is performed in addition to the first determination. The second determination is performed to determine whether incident sunlight is detected, by recognizing continuous reception of light in an angle range based on a viewing angle (apparent diameter) of the Sun (second determination).

In one example, assuming that the vertical rotation unit 314 rotates 20 times per second, and a frequency of emitting scanning light is 50 kHz, pulses (50×103/20=2500 times) of scanning light are emitted in a range of 360 degrees along a vertical plane. In this case, an interval between points is 360 degrees/2500=0.144 degrees. That is, in terms of a viewing angle, an interval between adjacent scanned points is 0.144 degrees. As the rotation speed of the vertical rotation unit 314 decreases, this interval also decreases.

On the other hand, the apparent diameter of the Sun is approximately 0.5 degrees. Under these conditions, in the case in which incident light is continuously detected in an angle range of two or more times 0.144 degrees (or three or more times 0.144 degrees), the incident light is determined as being sunlight. An appropriate upper limit of the angle range is approximately 1 degree (in the case in which the angle is 1 degree or greater, other factors should be considered). Since the apparent diameter of the Sun is approximately 0.5 degrees, it is also possible that, for example, in a case in which light is continuously received in an angle range of 0.4 to 0.6 degrees, the detected light is determined as not being light that is reflected back from a scanned point but as being sunlight. This determination is performed with respect to a horizontal direction in addition to a vertical direction. As a result, presence of the Sun is detected in terms of a two-dimensional plane.

Herein, in the case in which each of the first determination and the second determination results in true (YES), it is determined that sunlight is detected, and a center direction at the time of detection is obtained. In one example, light that is determined as being sunlight may be received in an elevation angle range of 80 to 80.5 degrees in vertical scanning. In this case, it is presumed that the Sun is present at an elevation angle of (80 degrees+80.5 degrees)/2=80.25 degrees. A similar process is performed on a horizontal angle. These processes are performed by the sunlight incident direction measurement unit 211.

Sunlight that is scattered by fog or clouds causes an increase in apparent diameter of the Sun. In such a situation, the range of threshold for determining an apparent diameter is changed from the above-described range of 0.4 to 0.6 degrees to a range of 0.4 to 1.0 degrees by raising the upper limit. For example, settings of multiple steps, such as "Weather mode 1" and "Weather mode 2," may be used, and in response to selection of a certain mode, the range of threshold for determining an apparent diameter may be changed, as described above.

In one example, information of weather or clouds of an area in which laser scanning is to be performed, may be retrieved from the Internet, a database, or the like, and the above described weather mode may be selected on the basis of the weather information. In a case of acquiring information showing weather with a small amount of sunlight (e.g., cloudy or rainy weather), it may be determined that the processes of determining detection of sunlight cannot be correctly performed due to no detection of sunlight. It is also possible to perform determination of detection of sunlight by using only one of the first determination and the second determination.

The Sun direction acquisition unit 212 acquires a direction of the Sun at the time the direction of sunlight has been obtained, from astronomical data. For example, there is software that calculates the direction of the Sun based on a position (latitude, longitude, and elevation) and a time that are input. The direction of the Sun at the corresponding time can be acquired by using such software.

The attitude calculator 213 calculates an attitude of the laser scanning apparatus 200, based on the direction of the detected sunlight, as seen from the laser scanning apparatus 200, and the direction of the Sun, as seen from the laser scanning apparatus 200, derived from astronomical data.

In one example, it is assumed that the direction of the detected Sun is 10 degrees in horizontal angle and 80 degrees in vertical angle, relative to a reference direction of the laser scanning apparatus 200 at the time of initial set up. Herein, the horizontal angle is measured in a clockwise direction as seen from above in the vertical direction, whereas the vertical angle is measured in terms of elevation angle.

On the other hand, it is also assumed that the corresponding direction of the Sun acquired from astronomical data is 180 degrees in azimuth (due south in the Northern Hemisphere) and 80.5 degrees in elevation angle. The azimuth herein is measured in a clockwise direction from 0 degrees at the north as seen from above in the vertical direction.

Under these conditions, the horizontal angle in the reference direction of the laser scanning apparatus 200 in an absolute coordinate system is 170 degrees (angle position at 10 degrees to the east from the south), and an elevation angle reference in this direction is inclined from the horizontal direction by 0.5 degrees. If the laser scanning apparatus 200 is completely horizontal, an error in the elevation angle direction does not occur.

In this manner, the attitude in the absolute coordinate system of the laser scanning apparatus 200 is determined. The process is performed by the attitude calculator 213. It is noted that the absolute coordinate system is a coordinate system used in a GNSS and in a map.

One, some, or all of the laser scanning controller 209, the GNSS position measurement device 210, the sunlight incident direction measurement unit 211, the Sun direction acquisition unit 212, and the attitude calculator 213 may be implemented by an external device that is separated from the laser scanning apparatus 200, such as an external surveying data processing apparatus. This external device is composed of, for example, a personal computer (PC). It is necessary to preliminarily determine positional relationships between an antenna of the GNSS position measurement device 210 and an optical origin of the laser scanning apparatus 200.

Example of Processing

Figure 4:
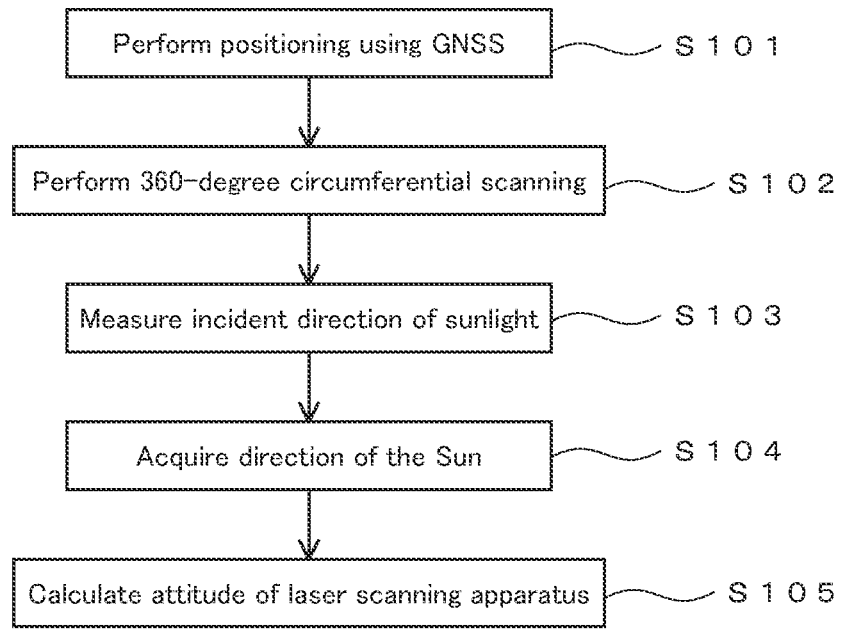
FIG. 4 is a flowchart showing an example of a processing procedure.

FIG. 4 shows an example of a processing procedure. The program for executing the processing in FIG. 4 is stored in the storage of the built-in computer of the laser scanning apparatus 200 and is read and executed by the CPU of the computer. It is also possible to store this program in an appropriate storage medium and to read this program therefrom for use.

Prior to the processing in FIG. 4, first, the laser scanning apparatus 200 is set up at a site at which laser scanning is to be performed. After the laser scanning apparatus 200 is set up, positioning using a GNSS is performed to obtain the position of the laser scanning apparatus 200 (step S101). In the case of obtaining high position accuracy, relative positioning is performed.

Then, 360-degree circumferential scanning is performed (step S102). The 360-degree circumferential scanning may be performed under conditions for normal scanning or may be performed by inserting a light reduction filter into an optical path, in order to avoid saturation of the light reception unit 202 due to effects of intense incident sunlight, causing difficulty in the detection itself of the incident light. Depending on the type of a light receiving element to be used, the latter method may be employed in consideration of effects of saturation. In a case in which an approximate direction of the Sun is already known, it is possible to perform scanning only in a limited direction.

The 360-degree circumferential scanning in step S102 provides light reception data. The light reception data includes a detected waveform of incident light received by the light reception unit 202 (output waveform of the light receiving element) and a relationship between the detected waveform and time. The detected waveform of the incident light is obtained by digitizing output of the light receiving element of the light reception unit 202 with the use of an analog-to-digital (A/D) converter, and the resultant digitized data is stored in the storage 208 in association with time. In the 360-degree circumferential scanning in step S102, in addition to the light reception data, point cloud data (measured distance values and directions of scanned points) may also be obtained.

Next, the incident direction of sunlight is measured based on the light reception data obtained in the 360-degree circumferential scanning in step S102 (step S103). In more detail, incident sunlight is identified based on a detected waveform, and the direction of the incident sunlight is measured. This process is performed by the sunlight incident direction measurement unit 211. Although an example of performing the process in step S103 after the 360-degree circumferential scanning in step S102 is described herein, the process in step S103 may be performed at the same time as scanning or may be performed in parallel to scanning with some delay.

Next, the direction of the Sun at the time of receiving sunlight is acquired by using astronomical data (step S104). This process is performed by the Sun direction acquisition unit 212. Then, the attitude in the absolute coordinate system of the laser scanning apparatus 200 is calculated based on results in steps S103 and S104 (step S105). This process is performed by the attitude calculator 213.

In this manner, the attitude (direction) in the absolute coordinate system of the laser scanning apparatus 200 is acquired by using the Sun. This processing does not require a highly accurate compass and an IMU, which eliminates the need for operation of these devices.

2. Second Embodiment

Sunlight that is reflected back from a wall surface of a high-rise building may be detected. A measure for coping with this situation will be described. In this example, after incident light is determined as being sunlight in the determination in the first embodiment, it is further determined whether a surface is detected on each upper and lower side or each right and left side in the direction in which the Sun is determined to be present. This additional determination is performed based on scanning data. In a state in which the Sun is actually present in this direction, there is no surface on each side in the direction of the Sun. This process is performed by the sunlight incident direction measurement unit 211.

This additional determination may be determination of whether a surface surrounding the direction in which the Sun is determined to be present is detected, or may be determination of whether a surface around the direction in which the Sun is determined to be present is detected. The surface is not limited to a flat surface and may be a curved surface (when there are high-rise buildings with curved wall surfaces).

3. Other Matters

Other Matter 1

This invention can also be viewed as an invention of a system. In one example, arithmetic calculations in the sunlight incident direction measurement unit 211, the Sun direction acquisition unit 212, and the attitude calculator 213 may be performed by cloud processing. In this case, laser scanning data is sent to a processing server, and the processing server executes arithmetic calculations on behalf of the sunlight incident direction measurement unit 211, the Sun direction acquisition unit 212, and the attitude calculator 213. Then, data related to the attitude of the laser scanning apparatus 200 is sent from the processing server to the laser scanning apparatus 200 or a user.

Other Matter 2

In the condition in which the area and the time are determined, it is possible to narrow down the range in which the Sun can be seen from the ground. Thus, the range of initial scanning can be set by using this relationship. This enables shortening the time required to perform scanning.

Other Matter 3

The position of the laser scanner 200 may be approximately set. In one example, the position of the laser scanner 200 may be determined based on position information on the level of prefecture, city, town, village, or ward, and the determined position may be used as the position information in step S101. In this case, an error is large compared with a case of using a GNSS, but an approximate attitude of the laser scanner 200 can be determined.

Other Matter 4

A reference detected waveform of laser scanning light that is reflected back is obtained in advance so as to be used as a reference for determining incident light that is received in actual measurement, and this reference detected waveform may be a theoretical value.

Other Matter 5

There may be cases in which incident light that is not of sunlight is erroneously determined as being sunlight. For example, light of a vehicle or a construction machine, or light of a searchlight, may be erroneously determined as being sunlight. In order to prevent such erroneous determination, the following algorithm is employed. This algorithm involves acquiring a position of the laser scanning apparatus and acquiring an approximate direction of the Sun at the time of measurement from astronomical data. Then, it is further determined whether the Sun is present in the corresponding direction, although incident light is determined as being sunlight based on a detected waveform and a time width of incidence. In a case in which the corresponding direction is in an area in which the Sun cannot be present, the incident light is determined as not being sunlight. This method avoids erroneous calculation of the attitude of the laser scanning apparatus 200 based on incident light that is not sunlight.

What is claimed is:

1. A surveying device comprising a processor or circuitry configured to:
   measure an incident direction of sunlight that enters a laser scanning apparatus, based on a detected waveform of incident light entering the laser scanning apparatus;
   acquire a direction of the Sun as seen from the laser scanning apparatus, from astronomical data, based on a position of the laser scanning apparatus; and
   calculate an attitude of the laser scanning apparatus in an absolute coordinate system, based on the incident direction of sunlight and the direction of the Sun as seen from the laser scanning apparatus, which is acquired from the astronomical data.

2. The surveying device according to claim 1, wherein the processor or circuitry is further configured to measure the incident direction of sunlight under a condition in which incident light is continuously detected in an angle range corresponding to an apparent diameter of the Sun.

3. The surveying device according to claim 2, wherein the laser scanning apparatus performs laser scanning at an angle interval $\Delta\theta$ that is shorter than the apparent diameter of the Sun, and the incident direction of sunlight is measured based on a difference between the angle interval $\Delta\theta$ and the angle range corresponding to the apparent diameter of the Sun.

4. The surveying device according to claim 2, wherein setting related to the apparent diameter is changeable in accordance with weather.

5. A surveying method comprising:
   measuring an incident direction of sunlight that enters a laser scanning apparatus, based on a detected waveform of incident light entering the laser scanning apparatus;
   acquiring a direction of the Sun as seen from the laser scanning apparatus, from astronomical data, based on a position of the laser scanning apparatus; and
   calculating an attitude of the laser scanning apparatus in an absolute coordinate system, based on the incident direction of sunlight and the direction of the Sun as seen from the laser scanning apparatus, which is acquired from the astronomical data.

6. A non-transitory computer recording medium storing computer executable instructions for surveying that are made to, when read and executed by a computer processor, cause the computer processor to:
   measure an incident direction of sunlight that enters a laser scanning apparatus, based on a detected waveform of incident light entering the laser scanning apparatus;

acquire a direction of the Sun as seen from the laser scanning apparatus, from astronomical data, based on a position of the laser scanning apparatus; and calculate an attitude of the laser scanning apparatus in an absolute coordinate system, based on the incident direction of sunlight and the direction of the Sun as seen from the laser scanning apparatus, which is acquired from the astronomical data.

\* \* \* \* \*